US012428875B2

(12) United States Patent
Lampei

(10) Patent No.: US 12,428,875 B2
(45) Date of Patent: Sep. 30, 2025

(54) ARRANGEMENT FOR TIPPING OVER PREVENTION OF A CHEST OF DRAWERS AND A CHEST OF DRAWERS COMPRISING SUCH ARRANGEMENT

(71) Applicant: Inter IKEA Systems B.V., Delft (NL)

(72) Inventor: Jan Lampei, Soedra Sandby (SE)

(73) Assignee: INTER IKEA SYSTEMS B.V. (NL)

( * ) Notice: Subject to any disclaimer, the term of this patent is extended or adjusted under 35 U.S.C. 154(b) by 0 days.

(21) Appl. No.: 18/267,444

(22) PCT Filed: Dec. 14, 2021

(86) PCT No.: PCT/SE2021/051250

§ 371 (c)(1),
(2) Date: Jun. 14, 2023

(87) PCT Pub. No.: WO2022/132006

PCT Pub. Date: Jun. 23, 2022

(65) Prior Publication Data

US 2025/0019999 A1 Jan. 16, 2025

(30) Foreign Application Priority Data

Dec. 14, 2020 (SE) .................................... 2051455-0

(51) Int. Cl.

*E05B 65/464* (2017.01)
*A47B 97/00* (2006.01)
*E05B 65/463* (2017.01)

(52) U.S. Cl.

CPC .......... *E05B 65/464* (2013.01); *E05B 65/463* (2013.01); *A47B 2097/008* (2013.01)

(58) Field of Classification Search

CPC .... E05B 65/462; E05B 65/463; E05B 65/464; A47B 2097/008; A47B 88/50; A47B 2210/0086

See application file for complete search history.

(56) References Cited

U.S. PATENT DOCUMENTS 2,966,384 A * 12/1960 Bergman .............. E05B 65/462 312/218
3,767,280 A * 10/1973 McLaughlin ......... E05B 65/462 312/219

(Continued)

FOREIGN PATENT DOCUMENTS

CN 101720375 A 6/2010
CN 104095421 A 10/2014

(Continued)

OTHER PUBLICATIONS

Chinese Search Report, CN202180083612.X, dated Jun. 29, 2025.
Chinese Office Action, CN202180083612.X, dated Jun. 29, 2025 (w_machine_English_translation).

*Primary Examiner* — Andrew Roersma
(74) *Attorney, Agent, or Firm* — Fishman Stewart PLLC

(57) ABSTRACT

An arrangement for tipping over prevention of a chest of drawers may include a drawer locking arrangement and an anchoring bracket. The drawer locking arrangement may include at least two locking members each configured to selectively engage an associated drawer, a guiding rail adapted to be mounted to a wall of the chest of drawers, a stop member configured to restrict movement of the at least two locking members such that only one drawer at a time is openable, and a driver connected to the guiding rail and/or the stop member and configured to indirectly interact with the at least two locking members. The anchoring bracket may include a first bracket member adapted to be mounted to the wall of the chest of drawers and a second bracket member including a guiding slot structured and arranged to receive a protrusion of the driver, thereby providing a cam mechanism.

20 Claims, 7 Drawing Sheets

(56) References Cited

U.S. PATENT DOCUMENTS

| | | | | | |
|---|---|---|---|---|---|
| 4,168,103 | A * | 9/1979 | Hagen | E05B 65/462 312/219 |
| 4,480,883 | A | 11/1984 | Young | |
| 4,768,844 | A | 9/1988 | Ludwig | |
| 4,863,132 | A | 9/1989 | Fitzgerald | |
| 5,056,877 | A | 10/1991 | Westwinkel | |
| 5,671,985 | A | 9/1997 | Grieser | |
| 5,702,167 | A * | 12/1997 | Muller | E05B 65/464 312/217 |
| 6,896,342 | B1 | 5/2005 | Cheng | |
| 7,946,663 | B2 | 5/2011 | Holcomb | |
| 9,260,889 | B2 | 2/2016 | Stijns | |
| 10,362,873 | B1 * | 7/2019 | Farnsworth | F16B 1/00 |
| 2003/0076016 | A1 | 4/2003 | Westwinkel | |
| 2018/0042379 | A1 | 2/2018 | Muskopf | |
| 2019/0365098 | A1 | 12/2019 | Johannesson | |

FOREIGN PATENT DOCUMENTS

| | | | | |
|---|---|---|---|---|
| DE | 20012281 | U1 * | 10/2000 | E05B 65/462 |
| DE | 102010010092 | A1 * | 9/2011 | E05B 65/464 |
| DE | 202015105093 | U1 * | 2/2017 | E05B 65/464 |
| DE | 202018104659 | U1 * | 12/2019 | |
| KR | 200407471 | Y1 * | 1/2006 | E05B 65/462 |
| WO | 2018106167 | A1 | 6/2018 | |

* cited by examiner

ARRANGEMENT FOR TIPPING OVER PREVENTION OF A CHEST OF DRAWERS AND A CHEST OF DRAWERS COMPRISING SUCH ARRANGEMENT

CROSS-REFERENCE TO RELATED APPLICATIONS

This application claims priority to International Patent Application No. PCT/SE2021/051250, filed on Dec. 14, 2021, and Swedish Patent Application No. 2051455-0, filed on Dec. 14, 2020, the contents of both of which are hereby incorporated by reference in their entirety.

TECHNICAL FIELD

The present invention refers to an arrangement for tipping over prevention of a chest of drawers and a chest of drawers comprising such arrangement.

BACKGROUND

A chest of drawers is a classical piece of furniture to store items in homes. The width and depth respectively of the chest of drawers is typically substantially smaller than the height. Thereby a large storing capacity is provided for while only requiring a limited footprint.

Each drawer defines a storing volume and as a drawer is opened, the center of mass will be displaced. This is in most cases never a problem since the underlying working principle of a chest of drawers is to pull out drawers to get access to the contents. It is however never possible to foresee how a piece of furniture is used in practice and in the worst-case scenario, the chest of drawers may tip over and cause severe personal injuries. Typical risks are when the drawers at a higher level are filled with a heavy load and opened, or when a person is leaning over or seeks support against the chest or a pulled-out drawer. The latter may especially be the case when children are using the chest of drawers, either when trying to get access to its contents by climbing, or simply playing around.

As a safety measure it is well known to use brackets of different types to fixate the chest of drawers against a wall to thereby safeguard against any tipping over. The brackets may by way of example be L-shaped brackets which are to be fixated to the wall. However, even though the chest of drawers is delivered with brackets and the manual explicitly prescribes that the brackets should be mounted before taking the chest of drawers into use, the user frequently decides not to mount the brackets. Frequent excuses are lack of time, complexity of the brackets, laciness and unawareness of risks involved in the event a tipping over should occur.

One measure to actively force the user to anchor the chest of drawers is disclosed in WO2018/106167. This document discloses an arrangement for tipping over prevention of a furniture. The arrangement comprises an anchoring bracket which is configured to interact with a locking arrangement which is designed to prevent drawers from being opened unless the chest of drawers is correctly anchored. When the chest of drawers is correctly anchored to the wall by the anchoring bracket, the function of the locking arrangement is set aside, thereby allowing any of the drawers to be selectively opened.

There are also solutions which prevent that more than one drawer is opened at a time. One such solution is disclosed in U.S. Pat. No. 5,671,985 where a locking member is slidable received in a longitudinally extending track member which is arranged in a side wall portion of the chest. The locking member is provided with one set of guiding ramps per drawer, where each set of ramps are configured to interact with a locking projection which is supported by each drawer. As one drawer is pulled to be opened, the engagement between the locking projection of that specific drawer interacts with the corresponding set of guiding ramps on the locking member, thereby causing a longitudinal displacement of the locking member inside the track member. The displacement of the locking member prevents the other drawers from being opened unless the first drawer is closed. This assembly may however be overruled by pulling two drawers simultaneously. Further, although the arrangement restricts the number of drawers that may be open at the same time, the safety problem remains, namely, there is no requirement of the chest of drawers being anchored. Thus, if the worse comes to worse, the chest of drawers may tip over.

Another locking system is disclosed in U.S. Pat. No. 4,768,844. In this locking system, each drawer is configured, via a respective pivotable cam mechanism, to cause a longitudinal displacement of a respective locking bar which is received in a common guiding channel in a wall portion of the chest. The displacement of the one or more locking bars cause a compression of a common spring which is received in a gap having a fixed length. The fixed length of the gap is chosen to allow the displacement of one locking bar which displacement is required to open one drawer and which displacement is the result of the pivoting of one single drawer's cam mechanism. Thereby only one drawer at the time may be opened. As a result of the fixed length of the gap, the system has an inherent mechanical restriction that prevents two or more drawers from being opened at the same time. Thus, this arrangement cannot be overruled, but, like in the solution mentioned above, there is no requirement of the chest of drawers being anchored.

It is however important from a user perspective that she can use the chest of drawers according to her own needs, without being restricted to open one drawer at a time. It is however essential from a safety perspective that this is made in a safe manner without the chest tipping. There is accordingly a need to find a solution which meets the issues mentioned above.

SUMMARY

An object of the present invention is to provide an arrangement for tipping over prevention of a piece of furniture, and especially a chest of drawers, that at least partly overcome the drawbacks and risks mentioned above.

More precisely, the arrangement should have a design that makes it mandatory for the user to anchor the piece of furniture in order to be able to use it properly.

Another object is that the arrangement should be reversible in the sense that if the anchoring is detached, e.g. during moving, the drawers should be automatically locked.

Yet another object is that the arrangement should be an integral part of the piece of furniture to thereby allow the same function also if the piece of furniture is moved to another location.

These and other objects are provided for by an arrangement for tipping over prevention of a chest of drawers, the arrangement comprising a drawer locking arrangement and an anchoring bracket; wherein the drawer locking arrangement comprises:

at least two locking members, each locking member being configured to selectively engage an associated drawer, and selectively allow only one drawer at a time may be opened;

a guiding rail adapted to be mounted to the wall of the chest of drawers; and a stop member configured to restrict movement of the at least two locking members such that only one drawer at a time may be opened;

a driver connected to the guiding rail or to the stop member, and said driver being configured to indirectly interact with the at least two locking members; and wherein the anchoring bracket comprises a first bracket member which is adapted to be mounted to the wall of the chest of drawers and a second bracket member which comprises a guiding slot which is arranged to receive a protrusion of the driver, thereby providing a cam mechanism, and wherein the second bracket member is movable in relation to the first bracket member between a first position and a second position, in which second position the second bracket member is adapted to be fixedly anchored to a structure separate from the chest of drawers, whereby when the second bracket member is in its first position, the driver is set to a first driver position in which the at least two locking members of the drawer locking arrangement are set to allow opening of one drawer only, and when the second bracket member is in its second position, the driver is set into a second driver position in which the stop member or the drawer locking arrangement is in a position in which all drawers are allowed to be selectively opened.

Accordingly, an arrangement for tipping over prevention of a chest of drawers is provided which, in a condition when the chest of drawers is anchored to a wall or another structure, sets a drawer locking arrangement from an active mode to a passive mode. When the drawer locking arrangement is set into the active mode, only one drawer at a time is allowed to be selectively opened. The user may freely choose which, but only one drawer at a time may be opened or be open. When set into the passive mode, the user is allowed to selectively open any drawer and any number of drawers at the same time.

Throughout the document the term chest of drawers is used. This term is to include furniture of the type having drawers and where the center of gravity may be changed during use by opening/closing the drawers. Non-limiting examples are chest of drawers for domestic use, office furniture and file cabinets.

The arrangement is very easy to use, since the only measure required is to anchor the second bracket member of the anchoring bracket to a structure separate from the chest of drawers, such as a wall in a building or another furniture. This may be made by any suitable fixing element such as a screw or a bolt. The fixing element may be mounted by a strict linear movement perpendicular to the structural part. During such anchoring, the drawer locking arrangement will automatically be set into its passive mode while at the same time the chest of drawers is prevented from tipping over. Correspondingly, when removing the fixing element, e.g. during a move, the drawer locking arrangement will automatically be re-set into its active mode where only one drawer at a time may be open.

All parts of the arrangement, except for the fixing element, may be pre-mounted to the chest of drawers. Thereby the risk of losing relevant parts over time, such as during a move, is eliminated. The chest of drawers will thereby maintain its tipping-over prevention feature and allow it to be fully used also on the second-hand market. Further, its operation is very intuitive, whereby the need for a user manual is reduced/eliminated.

The drawer locking arrangement may be provided as an integral unit to be arranged to a wall, preferably the inner side wall of the chest of drawers.

The arrangement for tipping over prevention has been exemplified as being applied to a chest of drawers. It is to be understood that the arrangement is equally applicable to other types of furniture with drawers where the center of gravity may be changed during use. Non-limiting examples are office furniture and file cabinets.

The drawer locking arrangement may be provided as an integral unit to be arranged to the inner side wall of the chest of drawers. The drawer locking arrangement is preferably arranged on the side wall of the chest of drawers so that the guiding rail has a vertical orientation. Thereby, gravity will facilitate the setting of the locking arrangement into its active mode to thereby selectively lock the drawers when the second bracket member of the anchoring bracket is not correctly secured to a structure and hence the chest of drawers is not correctly anchored.

Depending on the structural design of the drawer locking arrangement, the driver may be connected to the guiding rail or to the stop member. If the driver is connected to the guiding rail, the full drawer locking arrangement may be lifted when setting the second bracket member of the anchoring bracket from its first position to its second position, thereby bringing the at least two locking members of the drawer locking arrangement out of any engagement with the drawers. All drawers will thereby be allowed to be selectively opened.

If the driver instead is connected to the stop member, only the stop member will be lifted when setting the second bracket member of the anchoring bracket from its first position to its second position. By lifting the stop member, the length of the gap in the drawer locking arrangement is increased with a length that corresponds to the distance that the stop member is lifted. Thereby, the inherent mechanical restriction of the drawer locking arrangement that prevents two or more drawers from being opened at the same time may be set aside.

The protrusion of the driver will, as a result of the cam mechanism, be forced along the extension of the guiding slot as the second bracket member is moved to or from its second position. Thereby the drawer locking arrangement will be allowed to be set from the active mode in which only one drawer at a time may be opened into the passive mode in which the functionality of the drawer locking arrangement is set aside allowing any drawer or any number of drawers to be opened. The guiding slot as such may be provided as a throughgoing slot, i.e. extend through the full thickness of the second bracket member or be provided as a slot having a depth being smaller than the thickness of the second bracket member.

The guiding slot may comprise a first slot portion coinciding with the moving direction of the second bracket member, and a second slot portion forming an angle to the first slot portion.

The thus V-shaped extension acts as a cam mechanism when interacting with the driver. By the first slot portion, an extra safety measure is provided which prevents non-intended over-riding of the drawer locking arrangement when it is set in its active mode. To allow setting of the drawer locking arrangement from its active mode into its passive mode, a relative movement between second bracket member and the protrusion of the driver in two different directions must be provided for. This causes an inherent inertia which makes it very difficult, or even impossible to overcome if simply by force trying to pull out a second drawer of an incorrectly anchored chest of drawers if a first drawer is already open.

The angle between the two slot portions has an impact on the force that is required to move the second bracket member to its second position. The larger angle, the higher force is required. The angle is preferably in the range of 35-55 degrees and more preferred in the range of 40-50 degrees.

The first and second slot portions may each have a linear extension. It is to be understood that other extensions, such as single-curved extensions, may be used with remained function. Also, it is to be understood the two slot portions must not have the same geometrical extension. Thus, one of the portions may have a linear extension and the other may have a single-curved extension. It is further to be understood that the transition between the two slot portions may be provided with a radius.

The second bracket member may be moved in a direction transverse to a longitudinal extension of the guiding rail when set into the second position. Thus, while the drawer locking arrangement preferably has a substantially vertical extension along the side wall of the chest of the drawers, the second bracket member may be arranged to be moved into a flat abutting relationship with a structure, such as a wall of a room, to which the chest of drawers should be anchored.

The second bracket member may be biased in a direction towards the first bracket member. By such biasing, the anchoring bracket will as a default be set in a position where it does not influence the inherent functionality of the drawer locking arrangement. Thus, if the chest of drawer is not anchored to a structure by using the anchoring bracket, the drawer locking arrangement will have its ordinary intended functionality allowing only one drawer to be selectively open at a time.

The second bracket member may comprise a guiding portion and a mounting portion, wherein the mounting portion is pivotable in view of the guiding portion. By making the two portions pivotable in view of each other, packaging and transportation of the parts making up the chest of drawers may be facilitated. By way of example, the side wall of the chest of drawers may constitute a flat item although the anchoring bracket is pre-mounted thereon. The pivot may be provided by a hinge.

The guiding rail of the drawer locking arrangement may be movable in view of the side wall of the chest of drawers. This may be accomplished by the guiding rail being slidable received in a groove which is formed in the side wall of the chest of drawers. Alternatively, the guiding rail may be slidable received in a support rail which is arranged on the side wall of the chest of drawers. Such support rail may be either countersunk or be arranged on the surface of the side wall.

According to another aspect, a chest of drawers comprising an arrangement for tipping over prevention according to any of the features discussed above is provided. The arrangement for tipping over prevention has been thoroughly discussed above and the features and advantages are equally applicable to a chest of drawers using such arrangement. To avoid undue repetition, reference is given to the sections given above discussing the arrangement.

Each drawer of the chest of drawers may be supported by guiding and support rails which are arranged in the opposing side walls of the chest of drawers, wherein at least one of said guiding and support rails may be arranged on top of and across the guiding rail of the drawer locking arrangement. Thereby a robust mounting of the drawer locking arrangement is provided for. Also, this makes it more difficult for the user of the chest of drawers to actively on her own volition remove the drawer locking arrangement.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1:
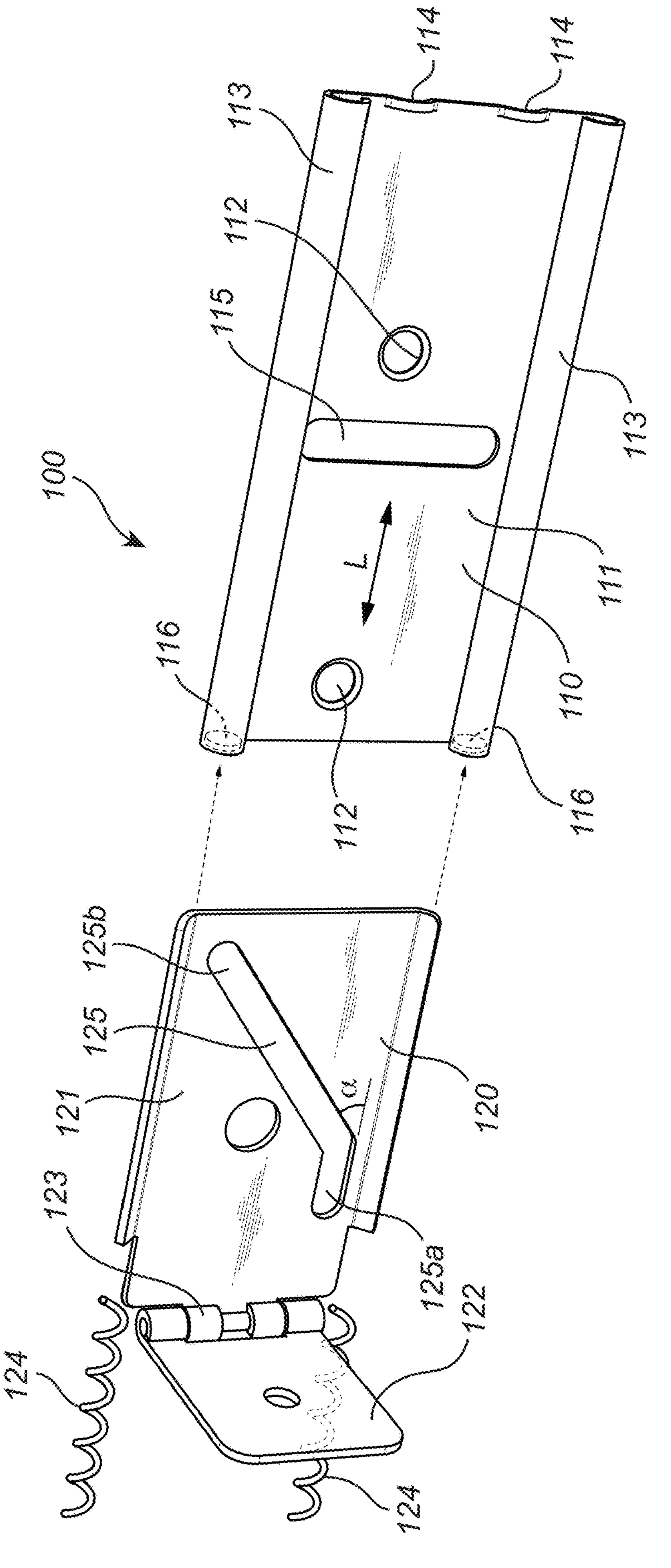
FIG. 1 is an exploded view of an anchoring bracket forming part of the arrangement for tipping over prevention.

In the following one embodiment of an arrangement 1 for tipping over prevention of a chest of drawers 2 will be described. The arrangement 1, see FIG. 3, comprises in its easiest form one anchoring bracket 100 and a drawer locking arrangement 200 which are connected to one side wall 3 of the chest of drawers 2. Although the arrangement for tipping over prevention will be exemplified as being applied to a chest of drawers, it is to be understood that the arrangement is equally applicable to other types of furniture with drawers where the center of gravity may be changed during use. Non-limiting examples are office furniture and file cabinets.

Starting with FIG. 1, an exploded view of the anchoring bracket 100 is disclosed. The anchoring bracket 100 comprises a first bracket member 110 and a second bracket member 120. The second bracket member 120 is slidably received in the first bracket member 110.

The first bracket member 110 comprises a longitudinally extending body 111 which is configured to be fixedly mounted to the side wall 3 of the chest of drawers 2. The side wall 3 of the chest of drawers is preferably arranged to extend substantially perpendicular to a structure 400 separate from the chest of drawers, such as a wall in a building or another furniture, to which the chest of drawers 2 is to be anchored. The fixation of the first bracket member 110 to the side wall 3 may be made by screws or the like which are received in two throughgoing holes 112 in the body 111 of the first bracket member 110. The thus fixed first bracket member 110 will also fixate the anchoring bracket 100 to the side wall 3 of the chest of drawers 2.

The longitudinally extending body 111 of the first bracket member 110 comprises an upper and a lower groove 113 extending along the longitudinal extension of the body 111. The grooves 113 are formed by folding the two opposing longitudinal edge portions of the body 111 towards the longitudinal centerline L of the body 111. Thereby the two grooves 113 are formed which allow the second bracket member 120 to be slidingly received relative to and along the longitudinal extension of the first bracket member 110.

A rear end of the first bracket member 110 comprises two stop members 114. The stop members 114 are in the disclosed embodiment formed as indents and are configured to form physical stops for the sliding engagement between the first and the second bracket members 110, 120. It is to be understood that a stop function may be provided for in other ways within the scope of the invention.

The first bracket member 110 comprises a throughgoing opening 115 having a longitudinal extension extending perpendicular to the longitudinal extension L of the first bracket member 10. The throughgoing opening 115 is configured to receive a protrusion 211 of a driver 210 to be discussed below.

The second bracket member 120 comprises a guiding portion 121 and a mounting portion 122. The mounting portion 122 is pivotable to the guiding portion 121 by a hinge 123. By making the two portions 121, 122 pivotable in view of each other, packaging and transportation of the parts making up the chest of drawers 2 may be facilitated. By the hinge 123, the side wall 3 of the chest of drawers 2 may constitute a flat item although the anchoring bracket 100 should be provided as a pre-mounted item thereto. It is to be stressed that the second bracket 120 with remained functionality of the invention may be provided as a rigid unit.

The guiding portion 121 is configured to be slidable received in the two grooves 113 of the first bracket member 110. The second bracket member 120 is movable in relation to the first bracket member 110 between a first position and a second position, in which second position the second bracket member 120 is adapted to be anchored to a structure separate from the chest of drawers 2.

The second bracket member 120 is biased in view of the first bracket member 110 in a direction towards the first position. The second bracket 120 is biased by two elastic members 124. The first position is a passive position to be discussed below. The two elastic members 124, embodied as coil springs, are configured to be received in the respective grooves 113 in the first bracket member 110. The two elastic members 124 are configured to act between a front end of the first bracket member 110 and a front end of the guiding portion 121 of the second bracket member 120. The elastic members 124 are maintained in the respective groove 113 by stoppers 116.

The second bracket member 120 comprises a V-shaped guiding slot 125 which is arranged to receive the protrusion 211 of the driver 210 to be discussed below. The guiding slot 125 will together with the protrusion 211 of the driver 210 form a cam mechanism which will be discussed below.

The V-shaped guiding slot 125 comprises a first slot portion 125*a* which has an extension which coincides with the moving direction of the second bracket member 120 in view of the first bracket element 110. Further, the V-shaped guiding slot 125 comprises a second slot portion 125*b* forming an angle $\alpha$ to the first slot portion 125*a*. The angle $\alpha$ between the two slot portions has an impact on the force that is required to move the second bracket member to its second position. The larger angle, the higher force is required. The angle $\alpha$ is preferably in the range of 35-55 degrees and more preferred in the range of 40-50 degrees.

Each of the first and second slot portions 125*a*, 125*b* have a linear extension. It is however to be understood that other extensions, such as single-curved extensions, may be possible with remained function. Also, it is to be understood the two slot portions 125*a*, 125*b* must not have the same geometrical extension. Thus, one of the slot portions may have a linear extension and the other may have a single-curved extension. The transition between the two slot portions 125*a*, 125*b* may be provided with a non-disclosed radius.

The guiding slot 125 is disclosed as a throughgoing slot. The skilled person understands that the same function may be provided for also if the slot has a depth that is smaller than the thickness of the second bracket member 120. No matter depth of the guiding slot 125, the protrusion 211 of the driver 210 will, as a result of the cam mechanism, be forced along the extension of the guiding slot 125 as the second bracket member 120 is set to or from its second position. Thereby the drawer locking arrangement will be allowed to be set from the active mode in which only one drawer at a time may be opened into the passive mode in which the functionality of the drawer locking arrangement is set aside allowing any drawer or any number of drawers to be opened.

The anchoring bracket 100 with its first and second bracket members 110, 120 may be formed by sheet metal, a plastic material or a composite material.

The anchoring bracket 100 is preferably provided as an integral unit pre-mounted to the side wall 3 of the chest of drawers 2 or as an integral unit to be mounted by the user herself when assembling the chest of drawers 2.

Figure 2:
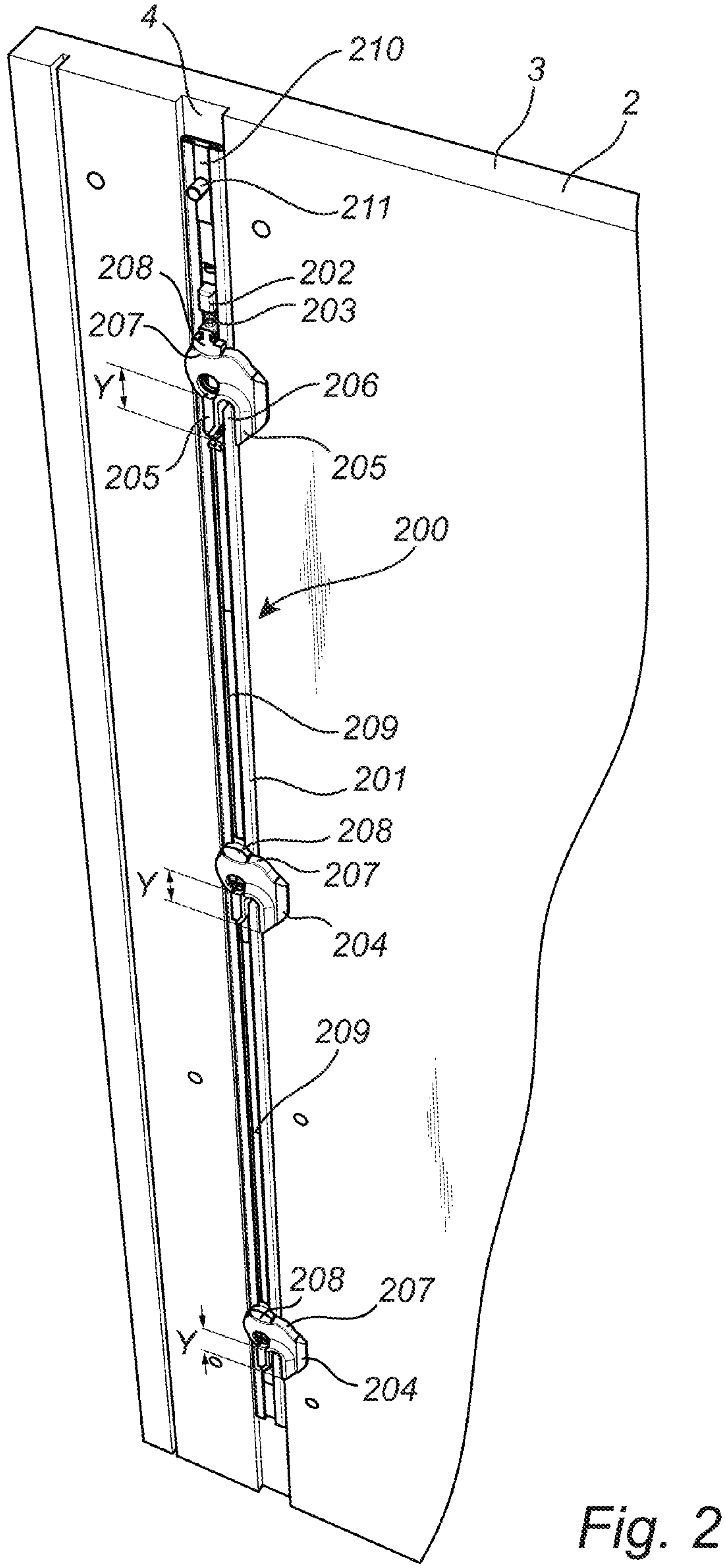
FIG. 2 is a part of a side wall of a chest of drawers supporting a drawer locking arrangement.

Now turning to FIG. 2 an overview of the drawer locking arrangement 200 will be disclosed. The drawer locking arrangement 200 is as such a well-known arrangement in the furniture industry. The drawer locking arrangement 200 is described in detail in e.g. U.S. Pat. No. 4,768,844 which is included by reference. The drawer locking arrangement as described in said patent is originally developed to allow only one drawer at a time to be opened. Also, the drawer locking arrangement 200 is originally designed to be fixedly mounted to a side wall of a chest of drawers. In the present invention this is however not the case. Instead, the drawer locking arrangement 200 is according to the present invention slidingly mounted to the side wall 3 of the chest of drawers 2. In the disclosed embodiment, the drawer locking arrangement 200 is received in a vertically extending groove 4 formed in the side wall 3 of the chest of drawers 2 as will be described below.

In the following the general working principle of the drawer locking arrangement 200 will be described. The drawer locking arrangement 200 comprises a longitudinally extending guiding rail 201. The guiding rail 201 is movable in view of the side wall 3 of the chest of drawers 2. In the disclosed embodiment, this is accomplished by the guiding rail 201 being slidable received in the groove 4 in the side wall 2. The groove 4 has a vertical extension. In an alternative, non-disclosed embodiment, the guiding rail 201 may be slidable received in a support rail which in turn may be arranged on the side wall of the chest of drawers. Such support rail may be either countersunk or be arranged on the surface of the side wall.

The guiding rail 201 comprises a stop member 202 which is arranged in an upper end portion of the guiding rail 201. The stop member 202 comprises a compressible spring 203. The spring 203 is compressible in view of the stop member 202 a pre-determined distance, which distance is limited to allow only one drawer at a time to be opened.

The guiding rail 201 further supports one locking member 204 per drawer 5 in the chest of drawers 2. In the disclosed embodiment, the drawer locking arrangement 200 is configured to be used for a chest of drawers containing three drawers 5, and hence the guiding rail 201 supports three locking members 204. Each locking member 204 is pivotable supported by the drawer locking arrangement 200.

Each locking member 204 comprises two fingers 205 which between them define a gap 206 which is configured to receive a pin 8 which is supported by the respective drawer 5. Note that the drawers 5 and their respective pins 8 are not disclosed in FIG. 2 but may instead be seen in FIGS. 4A-4D. In a position when the drawer 5 is closed, the pin 8 will be received in said gap 206. When pulling the drawer 5 to open the same, the pin 8 will cause the locking member 204 to pivot, whereby the engagement between the pin 8 and the fingers 205 will be released, thereby allowing the drawer to be pulled out.

An upper edge portion of the respective locking member 204 comprises a cam surface 207 which is configured to interact with a cam shaped pusher 208. In the disclosed embodiment, the upper most pusher 208 is arranged to interact with the spring 203 of the stop member 202, whereas the two subsequent pushers 208 are each indirectly interacting with spring 203 of the stop member 202 via rods 209 which are slidingly received in the guiding rail 201. Thus, when pivoting any of the locking members 204 below the upper most locking member 204, the rod or rods 209 of the one or more locking members 204 above the pivoted locking member 204, will be pushed upwardly to thereby act on the spring 203 of the stop member 202 to compress the same. As a result of the cam mechanism between the respective pusher 208 and the cam surface 207, the total compression length of the spring 203 of the stop member 202 will be the same no matter which locking member 204 is pivoted. By the limited allowed compression of the spring 203 allowed by the stop member 202, only one drawer at the time is allowed to be opened.

The drawer locking arrangement 200 according to the present invention additionally differs from the prior art drawer locking arrangement 200 in that it is provided with a driver 210 which comprises a protrusion 211. The driver 210 is fixedly arranged to the drawer locking arrangement 200.

In the disclosed embodiment, the driver 200 is arranged in an upper end portion of the drawer locking arrangement 200. By the driver 200 being fixedly arranged to the drawer locking arrangement 200, the whole drawer locking arrangement 200 will be displaced in the groove 4 in the side wall 3 of the chest of drawers by gripping the driver 200 and subjecting the same to a lifting action along the groove 4. Thus, as a result of the drawer locking arrangement 200 in the invention being slidably mounted to the side wall 3 of the chest of drawers 2, the complete drawer locking arrangement 200 will be displaced up and down along the groove 4 by lifting the driver 210.

Accordingly, by displacing the drawer locking arrangement 200 upwardly in the groove 4 by lifting the driver 210 a distance that exceeds an engagement length Y of the fingers 205 of the respective locking member 204, the locking function of the drawer locking arrangement 200 will be set aside. Thus, the fingers 205 will no longer engage any pin 8 of any drawer 5. Thereby any number of drawers may be selectively opened at the same time.

Figure 3:
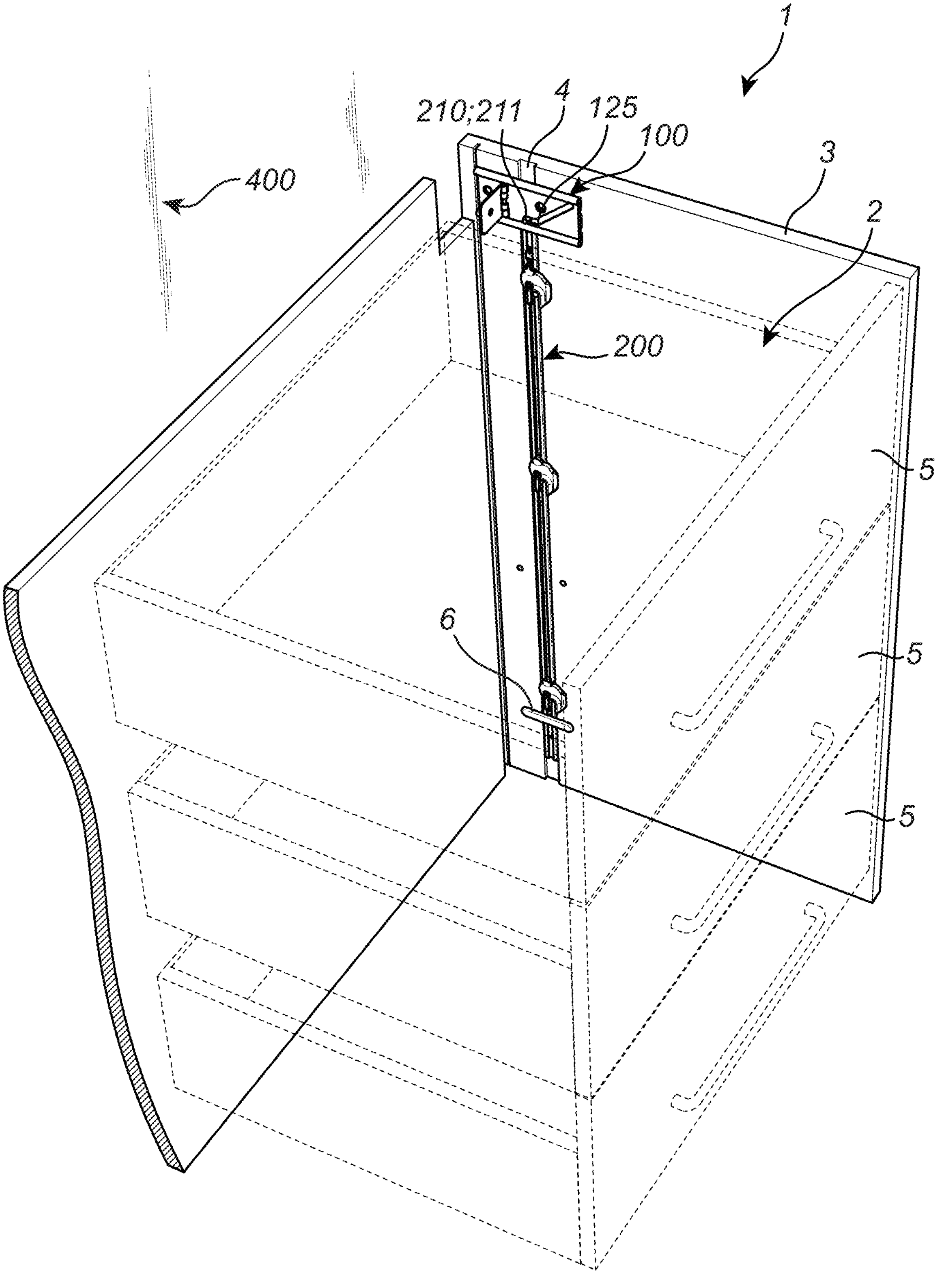
FIG. 3 is a highly schematic view of a chest of drawers with an anchoring bracket and a drawer locking arrangement.

Now turning to FIG. 3, a highly schematic illustration of the tipping over prevention 1 according to the invention is provided. The tipping over prevention 1 is applied to a chest of drawers 2 comprising three drawers 5. The three drawers 5 are disclosed as being fully closed. Also, the chest of drawers 2 is not anchored to the structure 400 behind the chest of drawers 2.

The drawer locking arrangement 200 is slidably received in the longitudinally extending groove 4 in the side wall 3 of the chest of drawers 2. The drawer locking arrangement 200 is held in place in the groove 4 by the anchoring bracket 400 being fixedly mounted to the side wall 3 across the groove 4 and hence across the drawer locking arrangement 200. To be explicitly noted is that the protrusion 211 of the driver 210 of the drawer locking arrangement 200 in this mounted position is protruding through the opening 115 in the first bracket member 110 and also through the guiding slot 125 in the second bracket member 120 of the anchoring bracket 100. As a result of the first bracket member 110 being biased towards its first position, the protrusion 211 of the driver 210 is received in the first slot portion **125*a* of the guiding slot 125. Thus, the anchoring bracket 100** is set in a position where only one drawer at a time may be selectively opened.

Further, a bracket 6 is arranged across the groove 4 and the drawer locking arrangement 200 in a lower end portion thereof. The skilled person realizes that such bracket 6 may be arranged in a number of ways within the scope of the invention and even may be omitted. It may by way of example be replaced by a non-disclosed guiding and support rail which is used to slidingly support the drawer in the horizontal direction.

Now turning to FIGS. 4A-4D the operation of the tipping over prevention 1 will be explained. To facilitate understanding, only the inner, upper most corner of the chest of drawers 2 is disclosed together with a portion of the upper most drawer 5. A vertical side wall 7 of the drawer 5 is disclosed in cross section to better illustrate the cooperation between the drawer 5 and the locking member 204 of the drawer locking arrangement 200. The vertical side wall 7 of each drawer 5 comprises a pin 8 which projects away from the drawer 5 towards the locking member 204.

Figure 4A:
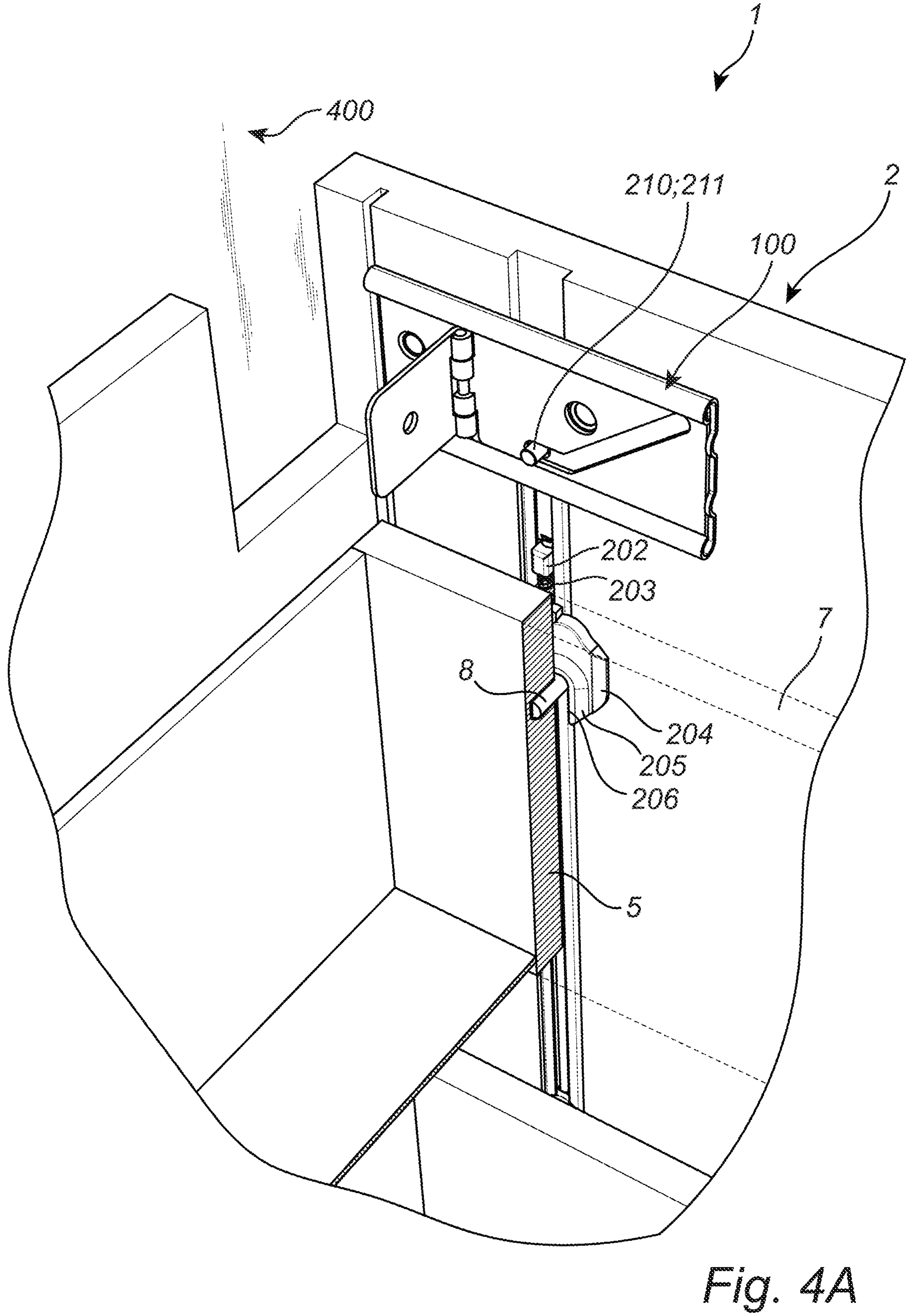
FIGS. 4A-4D schematically disclose the interaction between a drawer and the drawer locking arrangement before, during, and after anchoring the chest of drawers to a structure.

Starting with FIG. 4A, the drawer 5 is set to a fully closed position. The anchoring bracket 100 is fixedly mounted to the side wall 3 of the chest of drawers 2 and in view of the drawer locking arrangement 200 Also, the chest of drawers 2 is not anchored to the structure 400 behind. The second bracket member 120 of the anchoring bracket 100 is thereby biased towards its first position and the protrusion 211 of the driver 210 is in a first driver position where it is received in the first slot portion **125*a* of the guiding slot 125. The drawer locking arrangement's ordinary operation is thereby not affected whereby the drawer locking arrangement 200 has its ordinary intended function allowing only one drawer 5 at a time to be opened. Hence, the stop member 202 with its spring 203 is in a position where the pins 8 of the respective drawers 5 are received in the gaps 206 that are formed between the two fingers 205 of the respective locking members 204. Only one finger 205 is shown in FIG. 4A**.

Figure 4B:
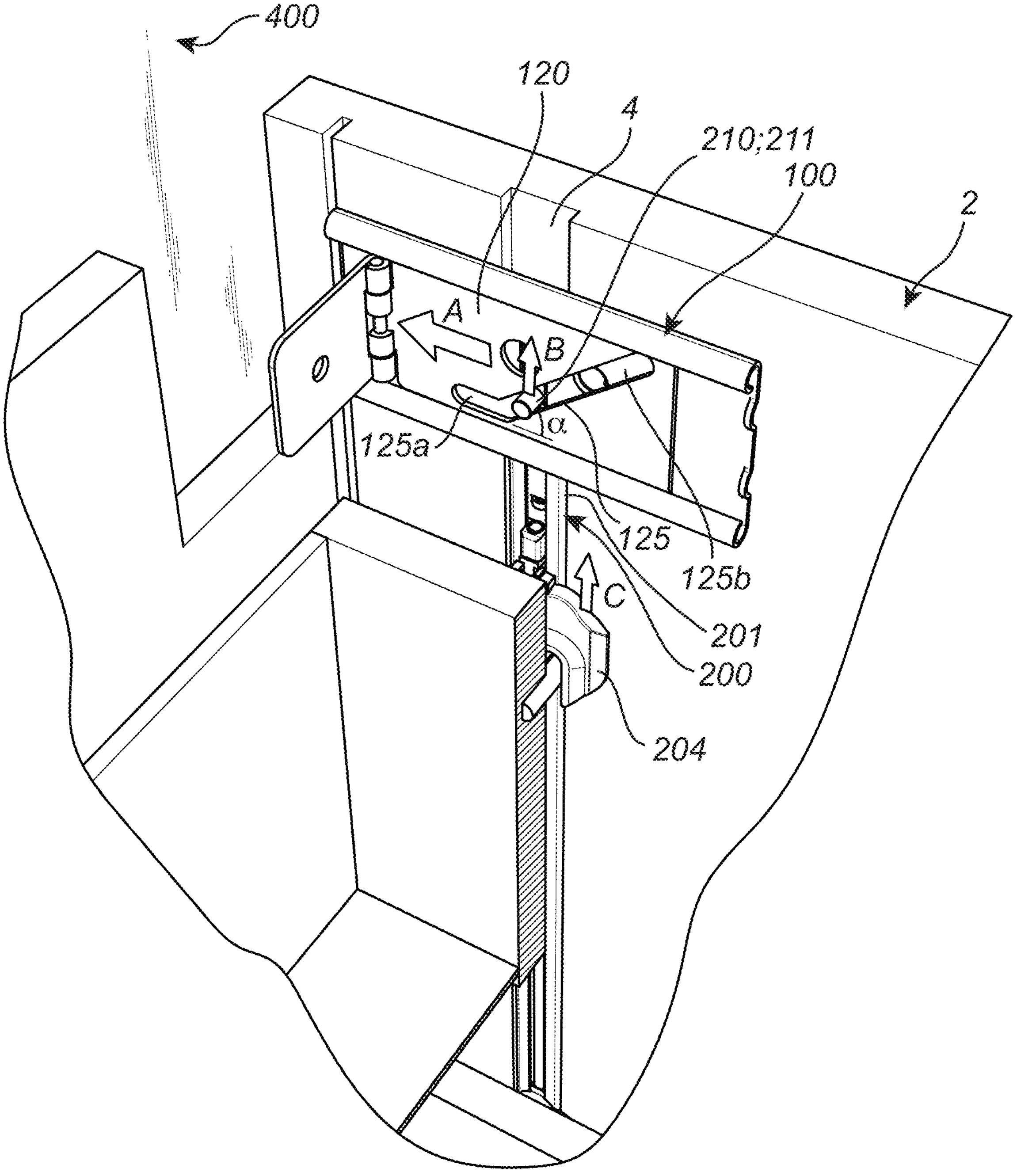

Now turning to FIG. 4B, the anchoring of the chest of drawers 2 to the structure 400 has been initiated. This is made by displacing, see arrow A, the second bracket member 120 of the anchoring bracket 100 towards the structure 400. During this displacement, the protrusion 211 of the driver 210 will be forced by the guiding groove 125 of the anchoring bracket 100 to lift the whole drawer locking arrangement 200 along the longitudinal extension of the groove 4 in the side wall 3 of the chest of drawers, see arrow B. Accordingly, this lifting, will also cause the locking member 204 of the drawer locking arrangement 200 to be displaced the same distance, see arrow C since it is part of the drawer locking arrangement 200.

The second bracket member 120, when set towards the second position to thereby anchor the chest of drawers 2 will be moved in a direction transverse to a longitudinal extension of the guiding rail 201 of the drawer locking arrangement 100. Thus, while the drawer locking arrangement 100 preferably has a vertical extension along the side wall 3 of the chest of the drawers 2, the second bracket member 120 may be moved into a flat abutting relationship with the structure 400 to which it should be anchored.

Figure 4C:
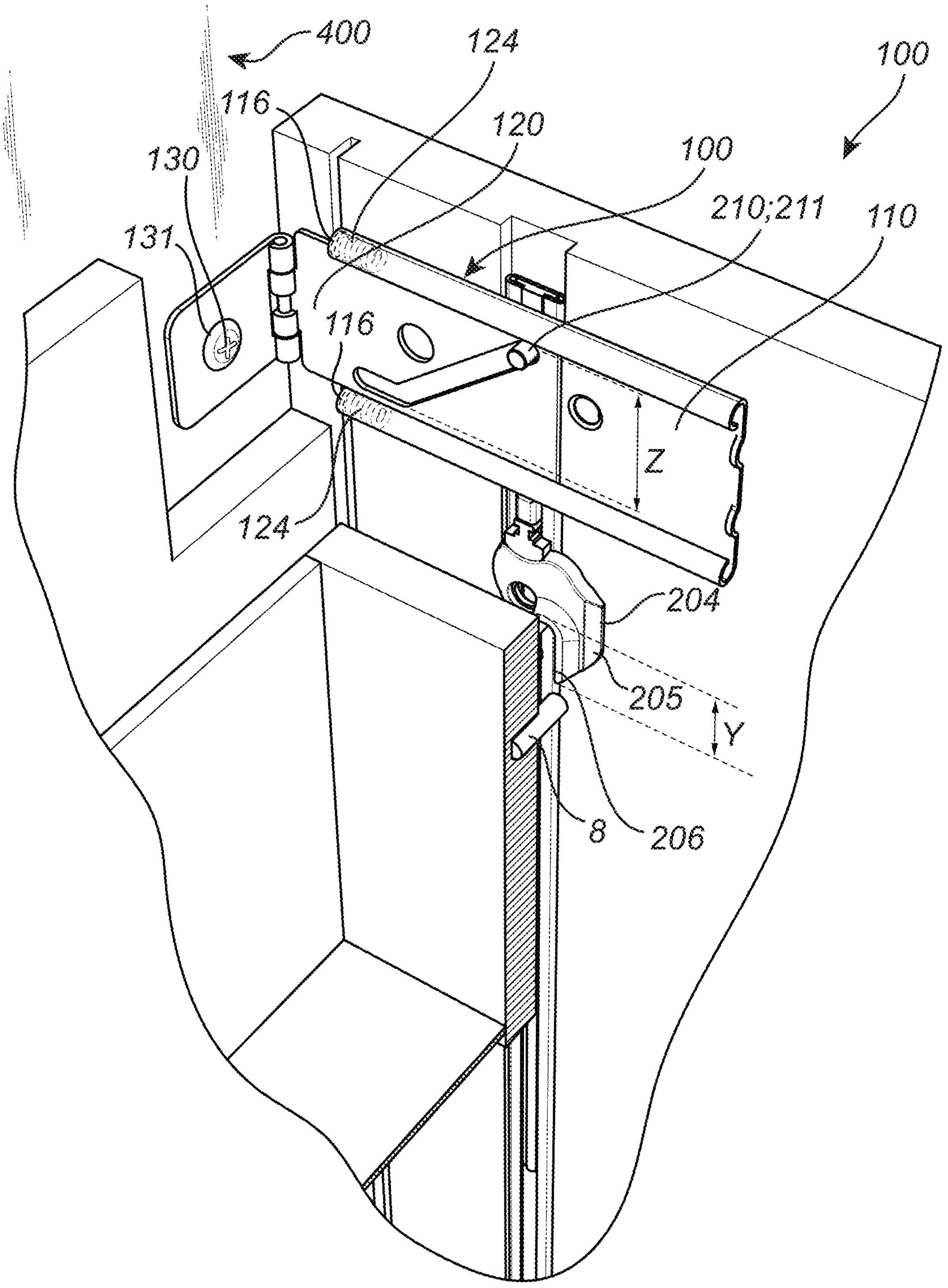
Figure 4D:
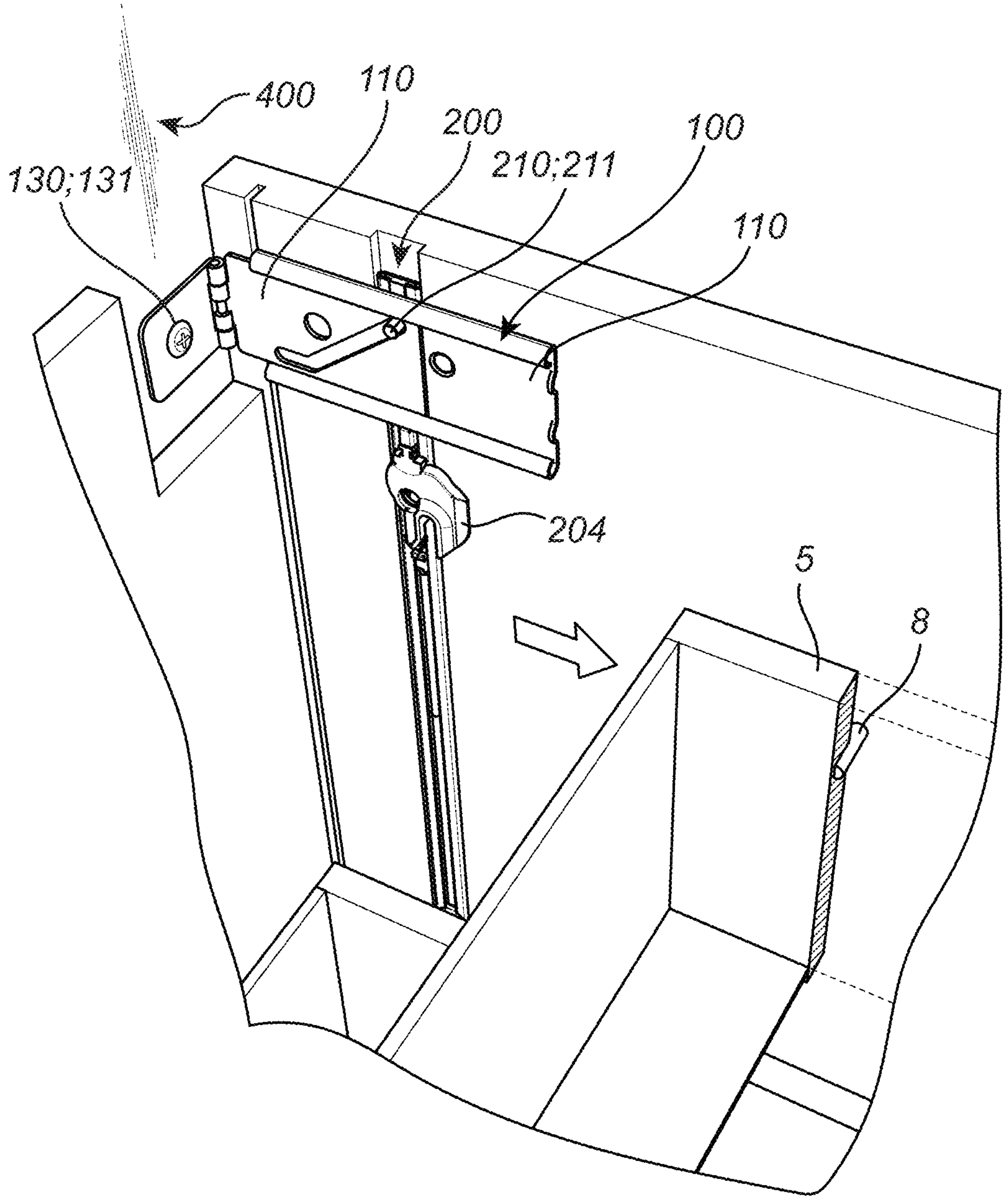

Now turning to FIGS. 4C and 4D, the chest of drawers 2 is mounted to the structure 400 by means of the second bracket member 120 of the anchoring bracket 100. This is made by a screw 131 engaging the structure 400 via a throughgoing hole 130 in the second bracket member 120. In this position, the second bracket member 120 has been displaced to such extent along the first bracket member 110 that the protrusion 211 of the driver 210 has been displaced along the second slot portion 125*b* into a second driver position. In this second driver position, the anchoring bracket 100 has displaced the complete drawer locking arrangement 200 in the vertical direction to such extent that the pin 8 of the drawer 5 is no longer received in the gap 206 between the fingers 205 of the locking member 204. The drawer locking arrangement 200 is thus lifted a distance that exceeds the engagement length Y of the fingers 205 of the respective locking member 204. This is allowed by the second slot 125*b* having a vertical height Z that corresponds to or more preferred exceeds the engagement length Y of the fingers 205.

Since the anchoring bracket 100 has caused a vertical displacement of the whole drawer locking arrangement 200, the released engagement between the locking member and the pin 8 applies not only to the disclosed drawer 5 but to all drawers 5 in the chest of drawers 2. Thus, two or more or all drawers 5 may now be selectively opened. Thus, the anchoring bracket is set to its position in which the functionality of the drawer locking arrangement 200 is set aside allowing any drawer 5 or any number of drawers 5 to be selectively opened.

As is specifically disclosed in FIG. 4C, in this anchored position, the elastic members 124 acting between the first and second bracket members 110, 120 of the anchoring bracket 100 have been compressed against the stoppers 116. This means that, if the anchoring should be released, e.g. to allow moving the chest of drawers, the second bracket member 120 will automatically spring back to its first position, being a passive position, where the driver 210 is in its first driver position where the protrusion 211 of the driver 210 is received in the first slot portion 125*a*, thereby setting the drawer locking arrangement 200 to its default active mode where only one drawer at a time may be opened. This may be seen as a safety measure.

Accordingly, an arrangement for tipping over prevention of a chest of drawers is provided which, in a condition when the chest of drawers is anchored to a wall or another structural part, sets a drawer locking arrangement from an active mode to a passive mode. When the drawer locking arrangement is set into the active mode, only one drawer at a time is allowed to be selectively opened. When set into the passive mode, the user is allowed to selectively open any drawer and any number of drawers at the same time.

The arrangement is very easy to use, since the only measure required is to secure the second bracket portion of the anchoring bracket to a structure separate from the chest of drawers, such as a wall in a building. This may be made by any suitable fixing element such as a screw or a bolt. The fixing element may be mounted by a strict linear movement perpendicular to the structure. During such mounting, the drawer locking arrangement will automatically be set into its passive mode while at the same time the chest of drawers will be prevented from tipping over. Correspondingly, when removing the fixing element, e.g. during a move, the drawer locking arrangement will automatically be re-set into its active mode.

All parts or the arrangement, except for the fixing element, may be pre-mounted to the chest of drawers. Thereby the risk of losing relevant parts during furniture moving is eliminated. The chest of drawers will thereby maintain its tipping-over prevention feature and allow it to be fully used by any second-hand user. Further, its operation is very intuitive whereby the need for a user manual is reduced/eliminated.

Depending on the structural design of the drawer locking arrangement, the driver may be fixedly connected to the guiding rail or to the stop member. If the driver is connected to the guiding rail as in the embodiment discussed above, the full drawer locking arrangement may be lifted when setting the second bracket member of the anchoring bracket from its first position to its second position.

If the driver instead is connected to the stop member, only the stop member will be lifted when setting the second bracket member of the anchoring bracket from its first position to its second position. By lifting the stop member, the spring will be allowed to have an increased compression length to thereby allow two or more and preferably all drawers to be selectively opened.

In the event of the chest of drawers is configured to be assembled by the user, the side wall of the chest of drawers may be supplied with the drawer locking arrangement and the anchoring bracket pre-mounted to the side wall portion. By the first and second bracket members being hinged to each other, the second bracket member may be pivoted to a position where it is substantially in parallel with the major surface of the side wall to thereby allow a reduced required transportation volume of a package.

Although not explicitly disclosed, it is to be understood that each drawer of the chest of drawers may be supported by guiding and support rails which are arranged in the opposing side walls of the chest of drawers, wherein at least one of said guiding and support rails may be arranged on top of and across the guiding rail of the drawer locking arrangement. Thereby a robust mounting of the drawer locking arrangement is provided for. Also, this makes it more difficult for the user of the chest of drawers to actively on her own volition remove the drawer locking arrangement.

The arrangement for tipping over prevention has been exemplified as being applied to a chest of drawers. It is to be understood that the arrangement is equally applicable to other types of furniture with drawers where the center of gravity may be changed during use. Non-limiting examples are office furniture and file cabinets.

The invention claimed is:

1. An arrangement for tipping over prevention of a chest of drawers, the arrangement comprising a drawer locking arrangement and an anchoring bracket, wherein:

the drawer locking arrangement includes:

- at least two locking members configured to selectively allow only one drawer at a time to be opened, each locking member of the at least two locking members configured to selectively engage an associated drawer;
- a guiding rail adapted to be mounted to a wall of the chest of drawers;
- a stop member configured to restrict movement of the at least two locking members whereby only one drawer at a time is openable; and a driver connected to the guiding rail and/or the stop member, the driver configured to indirectly interact with the at least two locking members;

the anchoring bracket includes:

a first bracket member adapted to be mounted to the wall of the chest of drawers; and a second bracket member including a guiding slot structured and arranged to receive a protrusion of the driver, thereby providing a cam mechanism;

the second bracket member is movable in relation to the first bracket member to a first position and to a second position, and in the second position the second bracket member is adapted to be fixedly anchored to a structure separate from the chest of drawers;

when the second bracket member is in the first position, the driver is set to a first driver position in which the at least two locking members are adapted to allow opening of one drawer only; and when the second bracket member is in the second position, the driver is set to a second driver position in which the stop member and/or the drawer locking arrangement is in a position adapted to allow all drawers to be selectively opened.

2. The arrangement according to claim 1, wherein the guiding slot includes a first slot portion coinciding with a moving direction of the second bracket member, and a second slot portion forming an angle α to the first slot portion.

3. The arrangement according to claim 1, wherein the second bracket member, when set to the second position, is moved in a direction extending transverse to a longitudinal extension of the guiding rail.

4. The arrangement according to claim 1, wherein the second bracket member is biased in a direction towards the first bracket member.

5. The arrangement according to claim 1, wherein:

the second bracket member further includes a guiding portion and a mounting portion; and the mounting portion is pivotable in relative to the guiding portion.

6. The arrangement according to claim 1, wherein the guiding rail is adapted to be movable relative to the wall of the chest of drawers.

7. A chest of drawers, comprising an arrangement for tipping over prevention according to claim 1.

8. The chest of drawers according to claim 7, further comprising a plurality of drawers, a plurality of guiding and support rails, and a plurality of walls including the wall, wherein:

each drawer of the plurality of drawers is supported by associated guiding and support rails which are arranged in opposing walls of the plurality of walls; and at least one of the plurality of guiding and support rails is arranged on top of and across the guiding rail of the drawer locking arrangement.

9. An arrangement for tipping over prevention of a chest of drawers, the arrangement comprising a drawer locking arrangement and an anchoring bracket, wherein:

the drawer locking arrangement includes:

at least two locking members configured to selectively allow only one drawer at a time to be opened, each locking member of the at least two locking members configured to selectively engage an associated drawer;

a guiding rail adapted to be mounted to a wall of the chest of drawers;

a stop member configured to restrict movement of the at least two locking members whereby only one drawer at a time is openable; and a driver connected to the guiding rail and/or the stop member, the driver configured to indirectly interact with the at least two locking members;

the anchoring bracket includes:

a first bracket member adapted to be mounted to the wall of the chest of drawers; and a second bracket member including a guiding slot structured and arranged to receive a protrusion of the driver, thereby providing a cam mechanism;

the second bracket member is movable in relation to the first bracket member to a first position and to a second position, and in the second position the second bracket member is adapted to be fixedly anchored to a structure separate from the chest of drawers;

when the second bracket member is in the first position, the driver is set to a first driver position in which the at least two locking members are adapted to allow opening of one drawer only;

when the second bracket member is in the second position, the driver is set to a second driver position in which the stop member and/or the drawer locking arrangement is in a position adapted to allow all drawers to be selectively opened;

the guiding slot includes (i) a first slot portion coinciding with a moving direction of the second bracket member and (ii) a second slot portion forming an angle α to the first slot portion; and the second bracket member is biased in a direction towards the first bracket member.

10. The arrangement according to claim 9, wherein the second bracket member, when set to the second position, is moved in a direction extending transverse to a longitudinal extension of the guiding rail.

11. The arrangement according to claim 9, wherein:

the second bracket member further includes a guiding portion and a mounting portion; and the mounting portion is pivotable in relative to the guiding portion.

12. The arrangement according to claim 9, wherein the guiding rail is adapted to be movable relative to the wall of the chest of drawers.

13. A chest of drawers, comprising an arrangement for tipping over prevention according to claim 9.

14. The chest of drawers according to claim 13, further comprising a plurality of drawers, a plurality of guiding and support rails, and a plurality of walls including the wall, wherein:

each drawer of the plurality of drawers is supported by associated guiding and support rails which are arranged in opposing walls of the plurality of walls; and at least one of the plurality of guiding and support rails is arranged on top of and across the guiding rail of the drawer locking arrangement.

15. An arrangement for tipping over prevention of a chest of drawers, the arrangement comprising a drawer locking arrangement and an anchoring bracket, wherein:

the drawer locking arrangement includes:

at least two locking members configured to selectively allow only one drawer at a time to be opened, each locking member of the at least two locking members configured to selectively engage an associated drawer;

a guiding rail adapted to be mounted to a wall of the chest of drawers;

a stop member configured to restrict movement of the at least two locking members whereby only one drawer at a time is openable; and a driver connected to the guiding rail and/or the stop member, the driver configured to indirectly interact with the at least two locking members;

the anchoring bracket includes:

a first bracket member adapted to be mounted to the wall of the chest of drawers; and a second bracket member including a guiding slot structured and arranged to receive a protrusion of the driver, thereby providing a cam mechanism;

the second bracket member is movable in relation to the first bracket member to a first position and to a second position, and in the second position the second bracket member is adapted to be fixedly anchored to a structure separate from the chest of drawers;

when the second bracket member is in the first position, the driver is set to a first driver position in which the at least two locking members are adapted to allow opening of one drawer only;

when the second bracket member is in the second position, the driver is set to a second driver position in which the stop member and/or the drawer locking arrangement is in a position adapted to allow all drawers to be selectively opened;

the second bracket member, when set to the second position, is moved in a direction extending transverse to a longitudinal extension of the guiding rail; and the second bracket member is biased in a direction towards the first bracket member.

16. The arrangement according to claim 15, wherein:

the second bracket member further includes a guiding portion and a mounting portion; and the mounting portion is pivotable in relative to the guiding portion.

17. The arrangement according to claim 15, wherein the guiding rail is adapted to be movable relative to the wall of the chest of drawers.

18. The arrangement according to claim 17, wherein the guiding slot includes:

a first slot portion coinciding with a moving direction of the second bracket member; and a second slot portion forming an angle $\alpha$ to the first slot portion.

19. A chest of drawers, comprising an arrangement for tipping over prevention according to claim 15.

20. The chest of drawers according to claim 19, further comprising a plurality of drawers, a plurality of guiding and support rails, and a plurality of walls including the wall, wherein:

each drawer of the plurality of drawers is supported by associated guiding and support rails which are arranged in opposing walls of the plurality of walls; and at least one of the plurality of guiding and support rails is arranged on top of and across the guiding rail of the drawer locking arrangement.

* * * * *